(12) United States Patent
Hinomoto et al.

(10) Patent No.: US 7,842,220 B2
(45) Date of Patent: Nov. 30, 2010

(54) MOLD FOR FORMING GOLF BALL AND GOLF BALL MANUFACTURED USING THE SAME

(75) Inventors: Shinichi Hinomoto, Chichibu (JP); Makoto Aoki, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 460 days.

(21) Appl. No.: 11/937,755

(22) Filed: Nov. 9, 2007

(65) Prior Publication Data

US 2009/0123595 A1   May 14, 2009

(51) Int. Cl.
*B29C 45/14* (2006.01)
*B29C 45/34* (2006.01)

(52) U.S. Cl. .............. 264/279.1; 249/141; 425/116; 425/546; 425/812

(58) Field of Classification Search ........... 425/116, 425/546, 812; 249/141
See application file for complete search history.

(56) References Cited

U.S. PATENT DOCUMENTS 2,378,586 A * 6/1945 Schultz .............. 249/141
6,129,881 A * 10/2000 Puniello ............. 425/116
6,776,942 B2   8/2004 Kim
6,877,974 B2   4/2005 Puniello et al.
7,654,817 B2 * 2/2010 Yagi et al. .......... 428/812
2005/0079239 A1 * 4/2005 Smith et al. ........ 425/812

FOREIGN PATENT DOCUMENTS

| JP | 07-080848 A | 3/1995 |
| JP | 2000-037480 A | 2/2000 |
| JP | 2003-190332 A | 7/2003 |
| JP | 2005-143610 A | 6/2005 |

* cited by examiner

*Primary Examiner*—Robert B Davis
(74) *Attorney, Agent, or Firm*—Sughrue Mion, PLLC

(57) ABSTRACT

There are provided a golf ball molding die in which a mold deposit produced when a gas is discharged can be removed easily, and the area of a venting opening per unit area of the tip end of a pin can be increased tremendously, and a golf ball manufactured by using the golf ball molding die. A golf ball molding die in accordance with the present invention includes at least two die bodies which are configured so that a cavity for forming a golf ball is formed by joining the die bodies to each other; a venting hole which is provided in at least one of the die bodies to discharge a gas in the cavity; and a pin which is present in the venting hole, the pin being configured so that a plurality of layers are lapped on each other from the center thereof.

10 Claims, 4 Drawing Sheets

MOLD FOR FORMING GOLF BALL AND GOLF BALL MANUFACTURED USING THE SAME

BACKGROUND OF THE INVENTION

The present invention relates to a golf ball molding die and a golf ball manufactured by using the golf ball molding die. More particularly, it relates to an improvement of a die used for molding a golf ball.

A golf ball is usually manufactured by an injection molding process or a compression molding process. In the both cases of these processes, a molding die is used. In this injection molding die, a spherical cavity is formed.

When a golf ball is molded, air that is present in a gap between the wall surface of the cavity and a rubber-made elastic body, which is a core material of the golf ball, and a gas released mixedly with a resin are discharged to the outside of the die through a gap between a vent pin accommodating hole provided in the wall surface of the cavity and a vent pin.

If the air and gas are not discharged well from the die, a defect is formed on the surface of the golf ball, e.g., what is called a weld-mark such as a bird footprint is formed on the surface of the product. To prevent such a defect, measures can be taken by increasing the number of installed vent pins. However, a plurality of support pins must be provided in the wall surface of the cavity to hold the core material, and also a plurality of protrusions for forming dimples must be arranged on the whole wall surface of the cavity, so that the number and positions of installed vent pins are restricted.

Japanese Patent Application Publication No. 2000-37480 describes a die in which the vent pin is formed of a porous material. Also, Japanese Patent Application Publication No. 7-80848 describes a die in which venting slits are provided in the wall surface of the cavity. When the gas is discharged, a minute amount of resin contained in the gas solidifies, so that a mold deposit is produced. The mold deposit produced in the porous vent pin or in the slit cannot be removed easily by cleaning etc., so that the venting performance is not restored.

U.S. Pat. No. 6,877,974 describes a vent pin that is formed by dividing the vent pin into two sections in the lengthwise direction of pin and by assembling the two pin sections each having a semicircular cross section into one vent pin having a circular cross section. On the mating surface between the two pin sections, a concavity forming an air outlet is provided. In this patent, the size of a venting opening capable of being provided per unit area of the tip end of pin is restricted.

SUMMARY OF THE INVENTION

An object of the present invention is to provide a golf ball molding die in which a mold deposit formed when a gas is discharged can be removed easily, and a venting opening area per unit area of the tip end of a pin can be increased tremendously, and a golf ball manufactured by using the golf ball molding die.

To achieve the above object, one aspect of the present invention provides a golf ball molding die, comprising at least two die bodies within which a cavity for forming a golf ball is formed by joining of the die bodies; a venting hole for discharging a gas in the cavity which is provided in at least one of the die bodies; and a pin which is present in the venting hole, wherein the pin comprises a plurality of layers which are stacked relative to the center axis of the pin.

The pin can have a circular cross section. The outer peripheral surfaces of the plurality of layers can be concentric in the cross section thereof. The plurality of layers constituting the pin is about two to about ten of layers. A clearance between the plurality of layers constituting the pin can be about 2 μm to about 50 μm.

Another aspect of the present invention provides a golf ball manufactured by a golf ball molding die. This golf ball molding die comprises at least two die bodies within which a cavity for forming a golf ball is formed by joining of the die bodies; a venting hole for discharging a gas in the cavity which is provided in at least one of the die bodies; and a pin which is present in the venting hole, wherein the pin comprises a plurality of layers which are stacked relative to the center axis of the pin.

DESCRIPTION OF THE PREFERRED EMBODIMENTS

One embodiment of the present invention will now be described by reference to the accompanying drawings. As a specific example, the case where a two-piece sold golf ball is manufactured by molding a cover layer around a rubber-made elastic body, which is a core material of the golf ball, by injection molding is explained. The present invention is not limited to this embodiment, and can be applied to other methods for manufacturing a golf ball.

Figure 1:
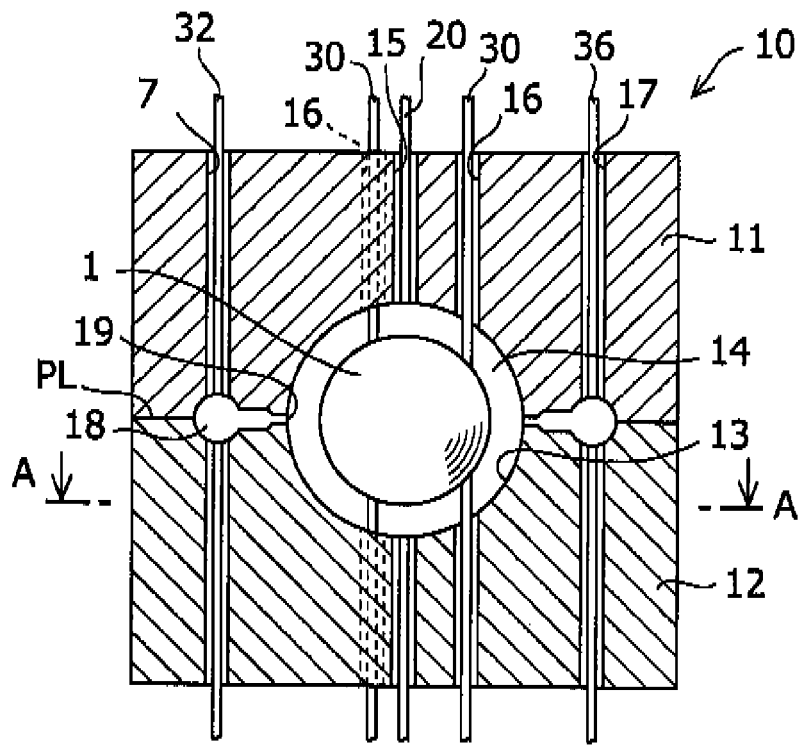
FIG. 1 is a sectional view of a golf ball molding die in accordance with one embodiment of the present invention.

As shown in FIG. 1, in the case where a golf ball is manufactured by an injection molding process, an injection molding die 10 is used. This injection molding die 10 comprises an upper die 11 and a lower die 12 that are made of a metal. By separably joining the upper die 11 and the lower die 12 to each other, a spherical cavity 14 is formed in the die 10.

On a cavity wall surface 13 of the die 10, a large number of protrusions (not shown) for forming dimples on the surface of golf ball, that is, on the surface of cover layer are provided. A division plane PL of the upper die 11 and the lower die 12 is located at a position corresponding to the equator of the cavity 14. In the cavity wall surface 13, gas vent pin accommodating holes 15 for releasing a gas, which extend in the direction perpendicular to the division plane PL of the die 10, are provided at positions of the North Pole point and the South Pole point of the cavity 14. In the gas vent pin accommodating hole 15, a gas vent pin 20 is accommodated so as to be capable of advancing and retreating.

Figure 2:
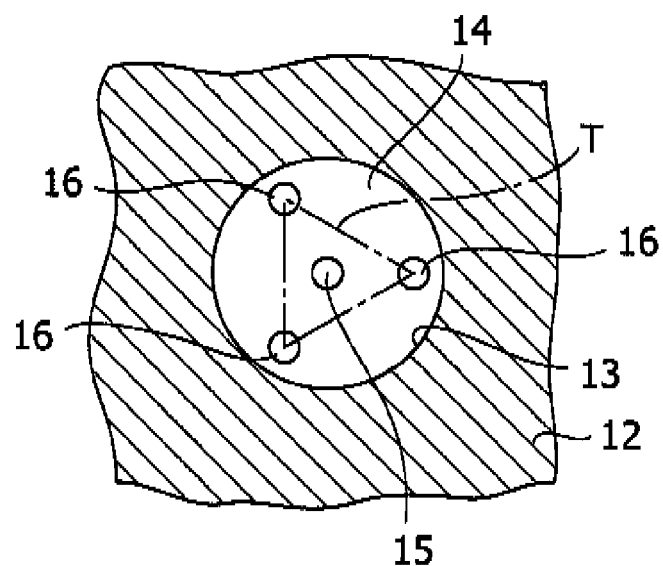
FIG. 2 is a plan view of a die viewed in the direction of the arrows A-A of FIG. 1.

As shown in FIG. 2, on the cavity wall surface 13, three support pin accommodating holes 16 extending in parallel with the gas vent pin accommodating holes 15 are provided. These three holes 16 are located at the vertexes of a regular triangle T whose center of gravity is the center axis of the cavity 14. In each of the support pin accommodating holes 16, a support pin 30 for supporting a rubber-made elastic body 1, which is the core material of golf ball, is disposed so as to advance and retreat. By advancing these support pins 30 into the cavity 14, the rubber-made elastic body 1 having been molded in advance in a separate process can be held in the central part of the cavity 14. The number and arrangement of support pins 30 are not limited to those shown in FIG. 2, and the number and arrangement thereof may be those capable of stably supporting the rubber-made elastic body 1 or an intermediate layer forming body.

Figure 3:
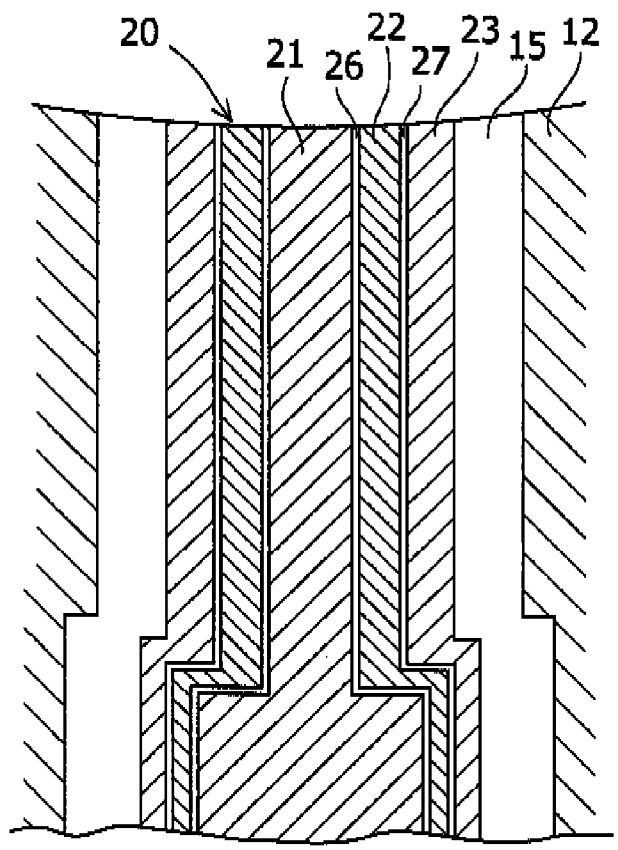
FIG. 3 is an enlarged sectional view of a gas vent pin shown in FIG. 1.
Figure 4:
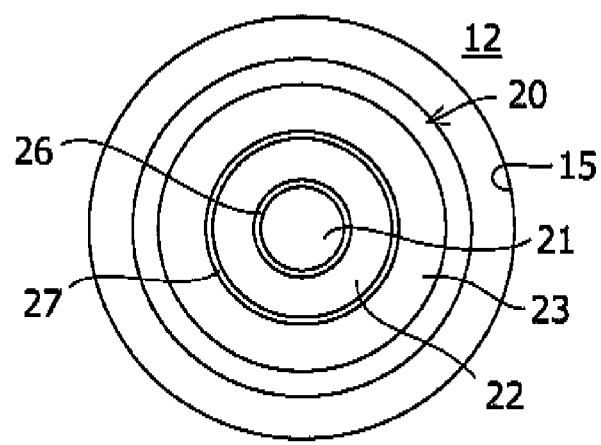
FIG. 4 is an enlarged plan view of a gas vent pin shown in FIG. 2.

FIG. 3 is an enlarged sectional view of the gas vent pin 20 and the gas vent pin accommodating hole 15. FIG. 4 is an enlarged plan view of the gas vent pin 20 and the gas vent pin accommodating hole 15, being viewed from the cavity 14 side. In FIGS. 1 and 2, the gas vent pin 20 and the gas vent pin accommodating hole 15 are shown as a pin and a hole having the same pin diameter and hole diameter and extending linearly. However, as shown in FIGS. 3 and 4, they can be a pin and a hole having different pin diameters and hole diameters and being formed with a step part.

As shown in FIGS. 3 and 4, in this embodiment, the gas vent pin 20 is composed of a pin center layer 21 having a circular cross section, a pin intermediate layer 22 that is located around the pin center layer 21 and has an annular cross section, and a pin outer shell layer 23 that is located around the pin intermediate layer 22 and has an annular cross section. All of the cross-sectional peripheral edges of these layers are formed so as to be concentric. Between the pin center layer 21 and the pin intermediate layer 22 and between the pin intermediate layer 22 and the pin outer shell layer 23, clearances 26 and 27 are provided, respectively. These clearances 26 and 27 communicate with the interior of the cavity 14, and also communicate with the outside of the die.

The number of layers of the gas vent pin 20 of the present invention is not limited to three. The gas vent pin 20 is preferably formed into a multilayer structure of two layers to about ten layers. A multilayer structure of two layers to about seven layers is further preferable, and that of two layers to about five layers is still further preferable. By forming the gas vent pin 20 into a multilayer structure of two layers to about ten layers, clearances between layers can be provided effectively, by which the venting efficiency can be increased, and also a complicated construction of vent pin can be prevented. An increase in the number of layers exceeding about ten layers is unpreferable because the diameter of vent pin becomes too large, or the driving mechanism becomes complicated.

The lower limit value of the clearance between layers of such a multilayer structure is preferably about 2 μm, further preferably about 5 μm, and still further preferably about 10 μm. If the lower limit value of the clearance is lower than about 2 μm, the layers are liable to come into contact with each other, so that the durability of the vent pin 20 decreases, and also the venting efficiency decreases. If the upper limit value of the clearance exceeds about 10 μm, the resin material flows into the pin accommodating hole 15, so that not only burrs are produced easily but also poor molding is caused. In the case of a multilayer structure of three or more layers, all of the clearances between layers may be the same or may be different.

The cross-sectional shape of the vent pin 20 is not limited to a circular shape, and an arbitrary shape such as a polygonal shape or a dewdrop shape can be selected as the cross-sectional shape of the vent pin 20. Also, the tip end shape of the vent pin 20 can be flush with the cavity wall surface as shown in FIG. 3. The tip end shape of the vent pin 20 is not limited to the flush shape, and the tip end thereof can be formed into a protrusion shape to form a dimple.

The lower limit value of the diameter of the circular vent pin 20 is preferably about 0.8 mm, further preferably about 1.3 mm, and still further preferably about 2.0 mm. Also, the upper limit value of the diameter of the vent pin 20 is preferably about 7 mm, further preferably about 6 mm, and still further preferably about 5 mm. The diameter of vent pin smaller than about 0.8 mm is unpreferable because it is difficult for the vent pin to be formed into a multilayer structure. The diameter of vent pin larger than about 7 mm is unpreferable because it is difficult for the tip end of vent pin to be adapted to the dimple shape.

As the material for the vent pin 20, a metal such as stainless steel, or a film of PEEK, Teflon, or the like can be used although the material therefor is not limited to the aforementioned materials. These materials may porous. Also, the thicknesses of layers of the vent pin 20 can be designed appropriately based on the number of layers of the vent pin, the clearance between layers, and the diameter of the vent pin. In the case where a metal is used, the vent pin 20 can be formed so that a plurality of members having an annular cross section, each of which has a thickness for sufficiently keeping strength as each layer of pin, are lapped on each other. In the case where a film is used, the vent pin 20 can be formed by forming the film into a member having an annular cross section and by lapping a plurality of films on each other.

As for the appearance of golf ball, the dimples are present on the surface of golf ball. Therefore, by arranging the vent pin accommodating hole 15 and the vent pin 20 in the cavity wall surface 13 so as to match the dimple design, the appearance design of golf ball can be prevented from being marred. For example, it is preferable that the vent pin 20 be arranged at the position of dimple although the arrangement is not limited to this. It is further preferable that the vent pin 20 be arranged in a weld line form. It is sill further preferable that the vent pins 20 be arranged at both pole points of the cavity 14.

A resin is injected from the equator parts of the cavity 14, and the injected resins join at both pole points of the cavity 14. Therefore, by arranging the vent pins 20 at both pole points of the cavity 14, the air in the cavity 14 can be discharged effectively. Thereby, poor molding can be restrained, so that the production efficiency can be increased. Also, the number of the vent pin accommodating holes 15 provided in the cavity wall surface 13 can be decreased, whereby the construction of the die 10 can be simplified.

Figure 5:
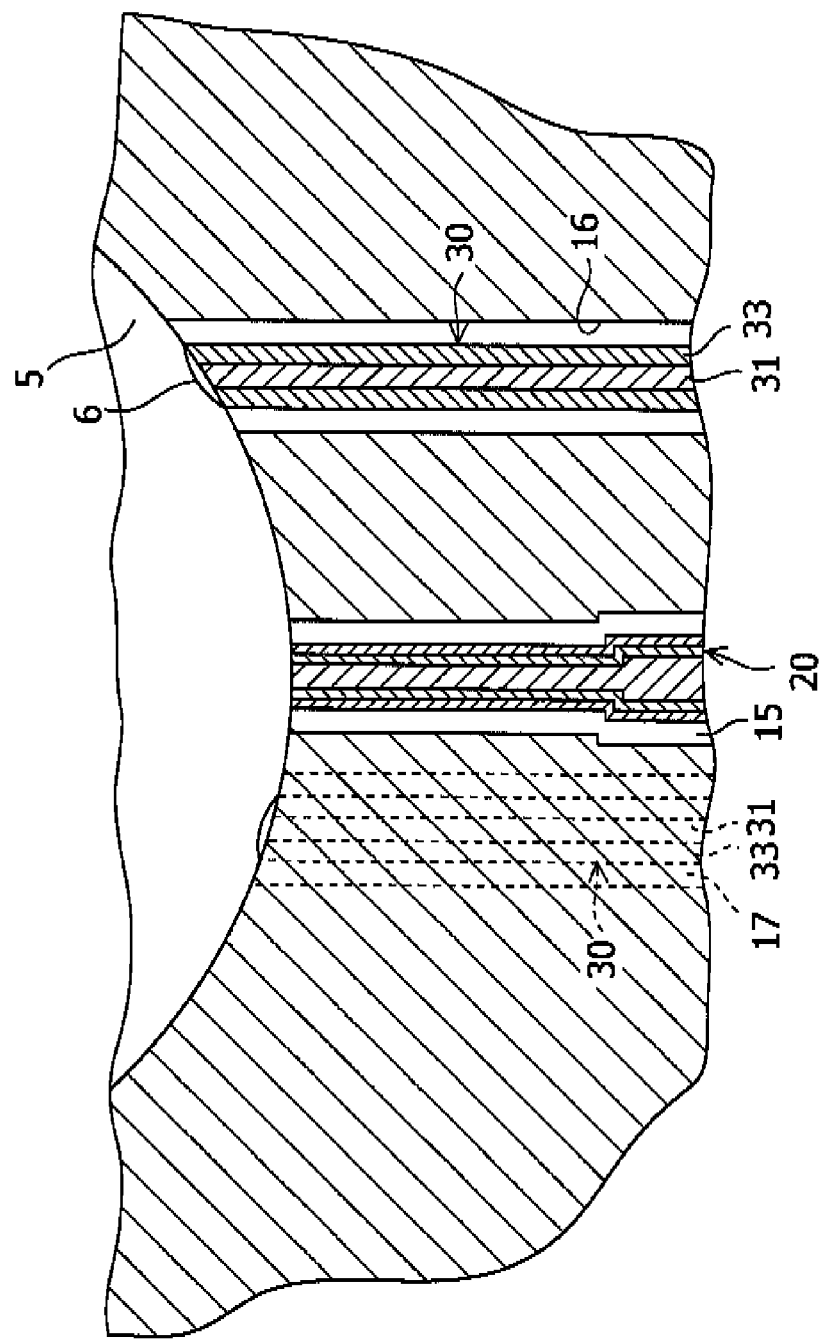
FIG. 5 is an enlarged sectional view of a gas vent pin and a support pin shown in FIG. 1.

Although the multilayer structure of the gas vent pin 20 has been explained above, the support pin 30 can also be formed into a multilayer structure. As shown in FIG. 5, the support pin 30 is formed by a pin core layer 31 and a pin outer shell layer 33. The support pin 30 as well can employ a specific configuration that is the same as that of the above-described vent pin 20. As shown in FIG. 5, the tip end of the support pin 30 is formed with a protrusion matching the shape of a dimple 6 on a core layer 5 of golf ball.

The upper limit value of a clearance between the vent pin accommodating hole 15 and the vent pin 20 is preferably about 30 μm, and further preferably about 25 μm. The lower limit value thereof is preferably about 10 μm, and further preferably about 15 μm. Also, the upper limit value of a clearance between the support pin accommodating hole 16 and the support pin 30 is preferably about 30 μm, and further preferably about 25 μm. The lower limit value thereof is preferably about 10 μm, and further preferably about 15 μm.

A ring-shaped runner 18 is provided so as to surround the equator of the cavity 14. A molding material injection gate 19 that is open to the interior of the cavity 14 is provided at a plurality of locations at equal intervals along the circumferential direction in an inner peripheral part of the ring-shaped runner 18. On the circumference of the ring-shaped runner 18 of the die 10, an ejector pin 36 that can be moved up and down in the direction perpendicular to the division plane PL and an accommodating hole 17 therefor are provided at a plurality of locations.

According to the configuration described above, first, as shown in FIG. 1, the rubber-made elastic body 1, which is the core material of golf ball, is placed between the upper die 11 and the lower die 12, and the upper die 11 and the lower die 12 are joined to each other, by which the cavity 14 is formed. The rubber-made elastic body 1 is supported in the central part by the three support pins 30. Then, a cover material whose main component is a thermoplastic resin is injected into the cavity 14 through the molding material injection gate 19. The cover material flows in a clearance part between the rubber-made elastic body 1 and the cavity wall surface 13, and join at the North Pole point and the South Pole point of the cavity 14, whereby the whole surface of the rubber-made elastic body 1 is coated with the cover material.

The air that is present in the clearance between the rubber-made elastic body 1 and the cavity wall surface 13 and the gas, such as a volatile component, that is released mixedly with the resin are discharged to the outside of the die 10 through the clearance between the gas vent pin 20 and the gas vent pin accommodating hole 15, and the clearances 26 and 27 between the layers 21, 22 and 23 constituting the gas vent pin 20. The above-described air and gas are also discharged to the outside of the die 10 through the clearance between the support pin 30 and the support pin accommodating hole 16, and the clearance (illustration is omitted) between the layers 31 and 32 constituting the support pin 30.

At the same time or immediately before the cavity 14 is filled with the cover material, the support pin 30 is pulled out so that the tip end of the support pin 30 retreats to the position of the cavity wall surface 13. Thereby, the rubber-made elastic body 1 is covered with the cover layer 5, and thereby the golf ball having the plurality of dimples formed on the surface of the cover layer 5 is manufactured. Even in the case where the resin curing in the runner 18 adheres firmly to the inside of the die 10 and the die is difficult to release, the die can be released easily by a pressure applied by raising the ejector pin 36 after molding.

Thus, the air and gas can be discharged not only through the clearance between the pin and the pin accommodating hole but also in the tip end part of the pin. In the case where the pin is formed into a multilayer structure, the opening area capable of discharging the gas in the tip end part of the pin increases tremendously as compared with the case where the pin is simply divided into two sections each having a semicircular shape.

When the gas is discharged, a minute amount of resin contained in the gas solidifies, and a mold deposit is produced in the clearance between the pin layers or in a pore created in the case where the pin is formed of a porous metal. The produced mold deposit can be removed easily by cleaning etc. performed by disassembling the layers of the pin, so that the venting performance can be restored easily.

The golf ball manufactured by using the golf ball molding die in accordance with the present invention has a good surface condition because the gas can be discharged effectively through the clearance between the pin layers, and also the clearance between the pin and the pin accommodating hole and the clearance between the pin layers can be made very small, so that the formation of burrs can be prevented.

The above is an explanation of a specific embodiment of the golf ball molding die in accordance with the present invention. However, the present invention is not limited to the above-described embodiment. All changes and modifications that are apparent to those skilled in the art are embraced in the technical scope of the present invention.

Figure 6:
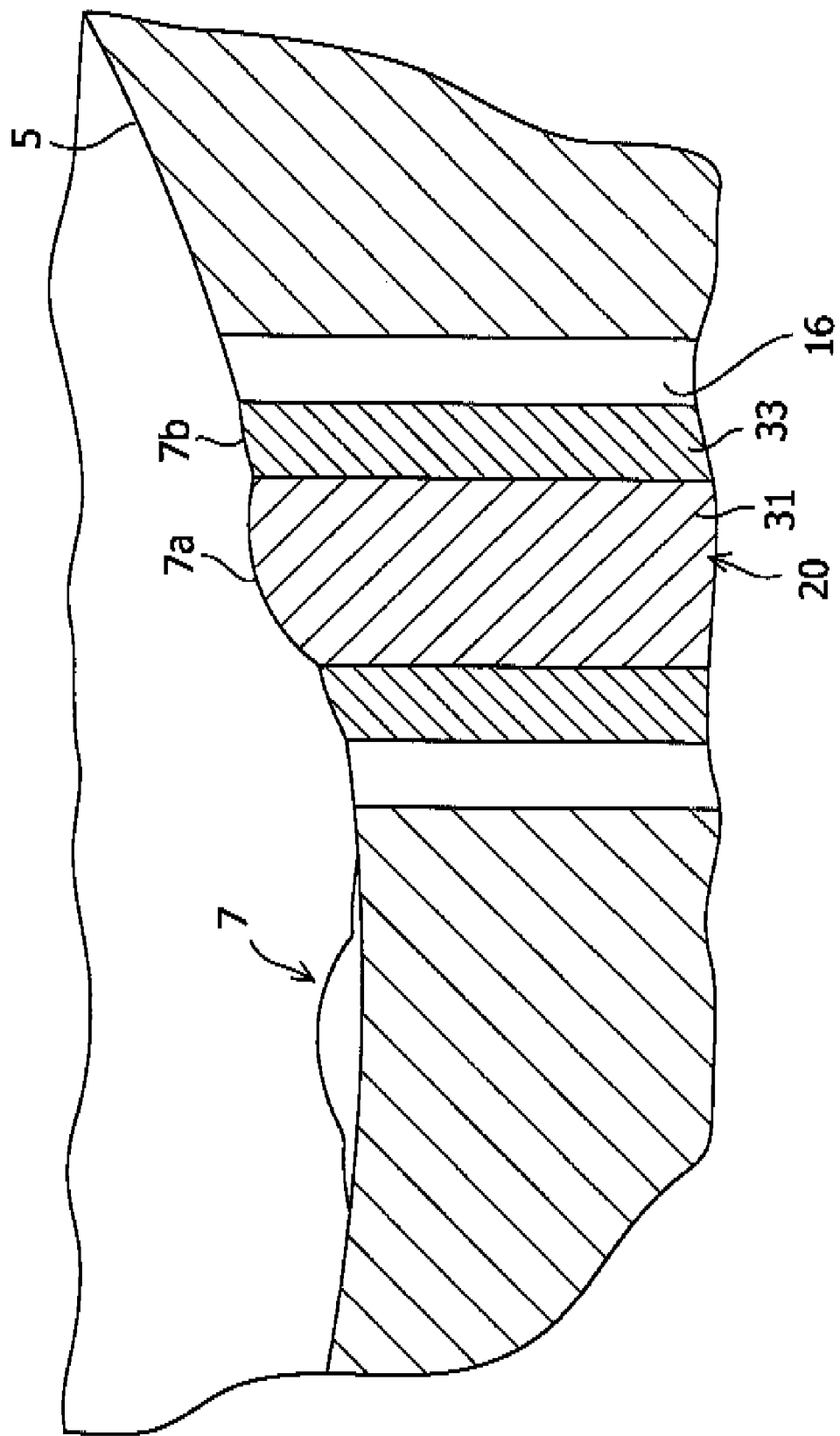
FIG. 6 is an enlarged sectional view of the tip end of a support pin in accordance with another embodiment of the present invention.

For example, in the case where dual dimples 7 are formed on the cover layer 5 of golf ball, as shown in FIG. 6, the tip end part of the pin core layer 31 of the support pin 30 can be formed into a shape matching a central dimple 7a of the dual dimple 7, and the tip end part of the pin outer shell layer 33 of the support pin 30 can be formed into a shape matching a sub dimple 7a at the outer periphery of the central dimple 7a.

For example, in the case where a three-piece solid golf ball is manufactured by forming an intermediate layer between the core material and the cover layer, the gas vent pin and the support pin of the die for forming this intermediate layer can also be formed into a multilayer structure. In this case, since dimples are not needed on the surface of the intermediate layer, the tip end part of the pin is made flush with the cavity wall surface.

What is claimed is:

1. A golf ball molding die, comprising:
   at least two die bodies within which a cavity for molding a golf ball is formed by joining of the die bodies;
   a venting hole for discharging a gas in the cavity which is provided in at least one of the die bodies; and
   a pin which is present in the venting hole, the pin having a diameter from about 0.8 mm to about 7 mm,
   wherein the pin comprises a plurality of layers which are stacked relative to the center axis of the pin and the plurality of layers form a plurality of channels within the pin that extend from the cavity to an outer side of the molding die.

2. The golf ball molding die according to claim 1, wherein the pin has a circular cross section, and the outer peripheral surfaces of the plurality of layers are concentric in the cross section thereof.

3. The golf ball molding die according to claim 1, wherein the plurality of layers constituting the pin is about two to about ten of layers.

4. The golf ball molding die according to claim 1, wherein a clearance between the plurality of layers constituting the pin is about 2 μm to about 50 μm.

5. A method of manufacturing a golf ball, the method comprising:
   providing a core body in the golf ball molding die of claim 1;
   injecting a cover material into the cavity of the golf ball molding die;
   venting gas through the channels of the pin.

6. The golf ball molding die according to claim 1, wherein the pin is made of a material of metal or film.

7. The golf ball molding die according to claim 6, wherein the metal is stainless steel.

8. The golf ball molding die according to claim 6, wherein the film is made of polyetheretherketone (PEEK) or Teflon.

9. The golf ball molding die according to claim 1, wherein the pin is to form a dual dimple on the surface of the golf ball.

10. The golf ball molding die according to claim 9, wherein the plurality of layers comprises a pin core layer and pin outer shell layer, a tip end part of the pin core layer being formed into a shape matching a central dimple of the dual dimple, and a tip end part of the pin outer shell layer being formed into a shape matching a sub dimple at the outer periphery of the central dimple.

* * * * *